US011290316B2

(12) United States Patent
Ali Shah et al.

(10) Patent No.: US 11,290,316 B2
(45) Date of Patent: Mar. 29, 2022

(54) METHODS, SYSTEMS, AND COMPUTER READABLE MEDIA FOR EFFICIENT COMPENSATION OF RESIDUAL PHASE NOISE IN 5G NEW RADIO (NR) DOWNLINK (DL) SIGNALS

(71) Applicant: Keysight Technologies, Inc., Santa Rosa, CA (US)

(72) Inventors: Syed Faisal Ali Shah, Cary, NC (US); Steven Swanchara, Cary, NC (US); Roger Alan Slyk, Raleigh, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 83 days.

(21) Appl. No.: 16/818,666

(22) Filed: Mar. 13, 2020

(65) Prior Publication Data
US 2021/0288863 A1 Sep. 16, 2021

(51) Int. Cl.
*H04W 4/00* (2018.01)
*H04L 27/34* (2006.01)
(Continued)

(52) U.S. Cl.
CPC .... *H04L 27/3472* (2013.01); *H04L 25/03821* (2013.01); *H04L 27/0014* (2013.01); *H04L 27/01* (2013.01); *H04L 2027/0067* (2013.01)

(58) Field of Classification Search
CPC ........... H04L 27/3472; H04L 25/03821; H04L 27/0014; H04L 27/01; H04L 2027/0067;
(Continued)

(56) References Cited

U.S. PATENT DOCUMENTS 6,928,120 B1 * 8/2005 Zhang ................. H04L 27/2679
370/464
7,142,609 B2 11/2006 Terreault et al.
(Continued)

OTHER PUBLICATIONS

Buttar et al., Phase Noise Mitigation Techniques in OFDM System: A Survey, IEEE, 4 pages, 2015.*
(Continued)

*Primary Examiner* — Frank Duong (57) ABSTRACT

A method for determining and compensating for residual phase noise in a 5G NR DL signal includes converting a block of 5G NR DL time domain signal samples into a block of frequency domain samples for one OFDM data symbol and equalizing and combining the frequency domain samples that fall in an outermost sample accumulation region of each quadrant to form a first composite sample for each quadrant, selecting a signal constellation point belonging to one of the four outermost constellation point decision region as a reference constellation point, rotating at least some of the first composite samples so that the first composite samples are in the same quadrant as the reference constellation point, combining the rotated first composite samples to produce a second composite sample, calculating a phase error between the second composite sample and the reference constellation point, applying phase correction corresponding to the phase error to all subcarriers of the OFDM data symbol, and generating output data from the phase-error-corrected OFDM symbol.

20 Claims, 9 Drawing Sheets

(51) Int. Cl.
*H04L 27/01* (2006.01)
*H04L 25/03* (2006.01)
*H04L 27/00* (2006.01)

(58) Field of Classification Search
CPC . H04L 27/2621; H04L 5/0005; H04L 5/0007; H04B 10/6165
See application file for complete search history.

(56) References Cited

U.S. PATENT DOCUMENTS

| | | | | |
|---|---|---|---|---|
| 7,333,792 | B2* | 2/2008 | Hamamoto | H04L 27/2657 375/324 |
| 7,376,194 | B2 | 5/2008 | Kim | |
| 9,154,169 | B2* | 10/2015 | Rubin | H04L 27/2647 |
| 10,148,480 | B2 | 12/2018 | Ling et al. | |
| 10,411,925 | B2* | 9/2019 | Vihriala | H04L 27/2338 |
| 10,447,513 | B2* | 10/2019 | Kundargi | H04L 27/38 |
| 10,567,065 | B2* | 2/2020 | Kundargi | H04B 17/382 |
| 10,708,107 | B1* | 7/2020 | Neshaastegaran | H04L 27/2657 |
| 2006/0182015 | A1* | 8/2006 | Kim | H04L 27/2679 370/203 |

OTHER PUBLICATIONS

Neshaastegaran et al., Log-Likelihood Ratio Calculation for Pilot Symbol Assisted Coded Modulation Schemes With Residual Phase Noise, IEEE, 9 pages, May 2019.*
"5G; NR; Physical channels and modulation (3GPP TS 38.211 version 15.7.0 Release 15)," ETSI TS 138 211, V15.7.0, pp. 1-100 (Oct. 2019).
"3rd Generation Partnership Project; Technical Specification Group Radio Access Network; NR; Physical channels and modulation (Release 15)," 3GPP TS 38.211, V15.0.0, pp. 1-73 (Dec. 2017).
Kim et al., "An Efficient Carrier Phase Synchronization Technique for High-Order M-QAM-OFDM," IEEE Transactions on Signal Processing, vol. 56, No. 8, pp. 3789-3794 (Aug. 2008).
"Channel Equaliziation," Communication Capstone Design, Electrical Engineering, pp. 1-8 (2020).
"Chapter 4: Intersymbol Interference and Equalization," Wong & Lok: Theory of Digital Communications, 4. ISI & Equalization, pp. 1-24 (No Publication Date, Received Jan. 9, 2020).
Porto da Silva et al., "Widely Linear Equalization for IQ Imbalance and Skew Compensation in Optical Coherent Receivers," Journal of Lightwave Technology, pp. 1-11 (2016).
Nguyen et al., "Joint Simple Blind IQ Imbalance Compensation and Adaptive Equalization for 16-QAM Optical Communications," IEEE ICC 2015—Signal Processing for Communications Symposium, pp. 1-6 (2015).
"Introduction to LTE Device Testing: From Theory to Transmitter and Receiver Measurements," National Instruments, pp. 1-76 (2015).
Tazeen, "Equalization of LTE-OFDM Systems over Doubly Selective Channels," Department of Electronics and Communication Engineering, Thapar University, Patiala, pp. 1-58 (Jul. 2014).
Tandur et al., "Joint Adaptive Compensation of Transmitter and Receiver IQ Imbalance Under Carrier Frequency Offset in OFDM-Based Systems," IEEE Transactions on Signal Processing, vol. 55, No. 11, pp. 5246-5252 (Nov. 2007).
Wickert et al., "An Adaptive Baseband Equalizer for High Data Rate Bandlimited Channels," International Telemetering Conference Proceedings, pp. 1-10 (2006).
Bliss, "Automatic amplitude and phase equalization derived from frequency-domain data," Retrospective Theses and Dissertations, pp. 1-130 (1971).

* cited by examiner

METHODS, SYSTEMS, AND COMPUTER READABLE MEDIA FOR EFFICIENT COMPENSATION OF RESIDUAL PHASE NOISE IN 5G NEW RADIO (NR) DOWNLINK (DL) SIGNALS

TECHNICAL FIELD

The subject matter described herein relates to adding compensation for phase noise in RF signals. More particularly, the subject matter described herein relates to methods, systems, and computer readable media for efficient compensation of residual phase noise in 5G NR DL signals.

BACKGROUND

In RF communications networks where modulations in signal phase are used to include data, phase noise generally refers to offsets in phase between transmitted and received signals. Two types of phase noise that occur in 5G networks include intercarrier interference (ICI) and common phase error (CPE). Intercarrier interference is caused by subcarriers on adjacent frequencies interfering with each other and is unique to each subcarrier. Common phase error refers to phase rotation, which is common to all subcarriers in a 5G signal. The subject matter described herein is directed to compensating for common phase error or rotation that is common to all subcarriers in a 5G signal.

Receiver systems, such as those present in user equipment (UEs) and UE emulators, must be capable of detecting and compensating for CPE in real time to maintain throughput. For real UEs, the consequence of poor CPE compensation means reduced range, battery life, and/or throughput. Depending on the cost and quality of the UEs, poor CPE compensation may be tolerated by users to some degree. However, in the realm of high performance test systems designed to emulate hundreds of UEs, poor CPE compensation cannot be tolerated. In addition, simultaneous emulation of hundreds of UEs means that CPE compensation implemented by a test system cannot be computationally intensive. Accordingly, in light of these difficulties, there exists a need for methods, systems, and computer readable media for efficient compensation for residual phase noise for 5G NR DL signals.

SUMMARY

A method for determining and compensating for residual phase noise in a 5G new radio (NR) downlink (DL) signal includes receiving time domain samples of a 5G NR DL signal. The method further includes converting a block of the time domain samples into a block of frequency domain samples for one orthogonal frequency division multiplexed (OFDM) data symbol. The method further includes equalizing the frequency domain samples in the block of frequency domain samples of the OFDM data symbol. The method further includes selecting an outermost constellation point decision region in each of four quadrants of an OFDM signal constellation as a sample accumulation region. The method further includes combining equalized samples of the OFDM data symbol that fall in the sample accumulation region of each quadrant to form a first composite sample for each quadrant. The method further includes selecting a signal constellation point belonging to one of the four outermost constellation point decision regions as a reference constellation point. The method further includes rotating at least some of the first composite samples so that the rotated first composite samples are in the same quadrant as the reference constellation point. The method further includes combining the rotated first composite samples to produce a second composite sample. The method further includes calculating a phase error between the second composite sample and the reference constellation point. The method further includes applying phase correction corresponding to the phase error to all subcarriers of the OFDM data symbol. The method further includes generating output data from the phase-error-corrected OFDM symbol.

According to another aspect of the subject matter described herein, receiving the time domain samples of the 5G NR DL signal includes receiving the samples at a 5G user equipment (UE) device.

According to another aspect of the subject matter described herein, receiving the time domain samples of the 5G NR DL signal includes receiving the samples at a 5G user equipment (UE) emulator device.

According to another aspect of the subject matter described herein, converting the block of time domain samples into the block of frequency domain samples includes performing fast Fourier transform (FFT) processing of the time domain samples.

According to another aspect of the subject matter described herein, selecting the outermost OFDM signal constellation point decision region includes selecting, as the outermost signal constellation point decision region, a decision region of an OFDM signal constellation point having a largest distance from the origin.

According to another aspect of the subject matter described herein, combining the equalized samples that fall in the sample accumulation region of each quadrant includes adding I components of the equalized samples that fall in the sample accumulation region of each quadrant and adding Q components of the equalized samples that fall in the sample accumulation region of each quadrant.

According to another aspect of the subject matter described herein, rotating at least some of the first composite samples includes adding phase shifts to three of the first composite samples so that the three first composite samples are in the same quadrant as a fourth of the first composite samples.

According to another aspect of the subject matter described herein, combining the rotated first composite samples includes adding I components of the rotated first composite samples and adding Q components of the rotated first composite samples.

According to another aspect of the subject matter described herein, calculating the phase error includes calculating a phase difference between the second composite sample and a phase of the reference constellation point.

According to another aspect of the subject matter described herein, applying the phase correction to the subcarrier includes adding an amount of phase correction equal to and opposite in magnitude to the phase error to each subcarrier in the OFDM symbol.

According to another aspect of the subject matter described herein, a system for determining and compensating for residual phase noise in a 5G new radio (NR) downlink (DL) signal includes a frequency transform block for receiving time domain samples of a 5G NR DL signal and for converting a block of the time domain samples into a block of frequency domain samples for one orthogonal frequency division multiplexed (OFDM) data symbol. The system further includes an equalizer for equalizing the frequency domain samples in the block of frequency domain samples of the OFDM data symbol. The system further includes a sample region selector for selecting an outermost constellation point decision region in each of four quadrants of an OFDM signal constellation as a sample accumulation region. The system further includes a composite sample accumulator for combining equalized samples that fall in the sample accumulation region of each quadrant to form a first composite sample for each quadrant. The system further includes a composite sample quadrant rotator for selecting a signal constellation point belonging to one of the four outermost constellation point decision regions as a reference constellation point, for rotating at least some of the first composite samples so that the first composite samples are in the same quadrant as the reference constellation point, and for combining the rotated first composite samples to produce a second composite sample. The system further includes a phase error calculator for calculating a phase error between the second composite sample and the reference constellation point. The system further includes a phase corrector for applying phase correction corresponding to the phase error to all subcarriers of the OFDM symbol. The system further includes a bit decision block for generating output data from the phase-error-corrected OFDM symbol.

According to another aspect of the subject matter described herein, the system for compensating for residual phase noise in a 5G NR DL signal includes a 5G user equipment (UE) device, wherein the equalizer, the sample region selector, the composite sample accumulator, the composite sample quadrant rotator, the phase error calculator, the phase corrector, and the bit decision block are components of the 5G UE device.

According to another aspect of the subject matter described herein, the system for compensating for residual phase errors in a 5G NR DL signal includes a 5G user equipment (UE) emulator, wherein the equalizer, the sample region selector, the composite sample accumulator, the composite sample quadrant rotator, the phase error calculator, the phase corrector, and the bit decision block are components of the 5G UE emulator.

According to another aspect of the subject matter described herein, the sample region selector is configured to select, as the outermost signal constellation point decision region, a decision region of an OFDM signal constellation point having a largest distance from the origin.

According to another aspect of the subject matter described herein, the composite sample accumulator is configured to combine the equalized samples by adding I components of the equalized samples that falls in the sample accumulation region of each quadrant and adding Q components of the equalized samples that falls in the sample accumulation region of each quadrant.

According to another aspect of the subject matter described herein, the composite sample quadrant rotator is configured to rotate at least some of the first composite samples by adding phase shifts to three of the first composite samples so that the three first composite samples are in the same quadrant as a fourth of the first composite samples.

According to another aspect of the subject matter described herein, the composite sample quadrant rotator is configured to combine the rotated first composite samples by adding I components of the rotated first composite samples and adding Q components of the rotated first composite samples.

According to another aspect of the subject matter described herein, the phase error calculator is configured to calculate the phase error by calculating a phase difference between the second composite sample and a phase of the constellation point.

According to another aspect of the subject matter described herein, the phase corrector is configured to apply the phase correction to the subcarriers by adding an amount of phase correction equal to and opposite in magnitude to the phase error to each subcarrier in the OFDM symbol.

According to another aspect of the subject matter described herein, a non-transitory computer readable medium having stored thereon executable instructions that when executed by a processor of a computer control the computer to perform steps is provided. The steps include receiving time domain samples of a 5G new radio (NR) downlink (DL) signal. The steps further include converting a block of the time domain samples into a block of frequency domain samples for one orthogonal frequency division multiplexed (OFDM) data symbol. The steps further include equalizing the frequency domain samples in the block of frequency domain samples of the OFDM data symbol. The steps further include selecting an outermost constellation point decision region in each of four quadrants of an OFDM signal constellation as a sample accumulation region. The steps further include combining equalized samples of the OFDM data symbol that fall in the sample accumulation region of each quadrant to form a first composite sample for each quadrant. The steps further include selecting a signal constellation point belonging to one of the four outermost constellation point decision regions as a reference constellation point. The steps further include rotating at least some of the first composite samples so that the first composite samples are in the same quadrant as the reference constellation point. The steps further include combining the rotated first composite samples to produce a second composite sample. The steps further include calculating a phase error between the second composite sample and the reference constellation point. The steps further include applying phase correction corresponding to the phase error to all subcarriers of the OFDM symbol. The steps further include generating output data from the phase-error-corrected OFDM symbol.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
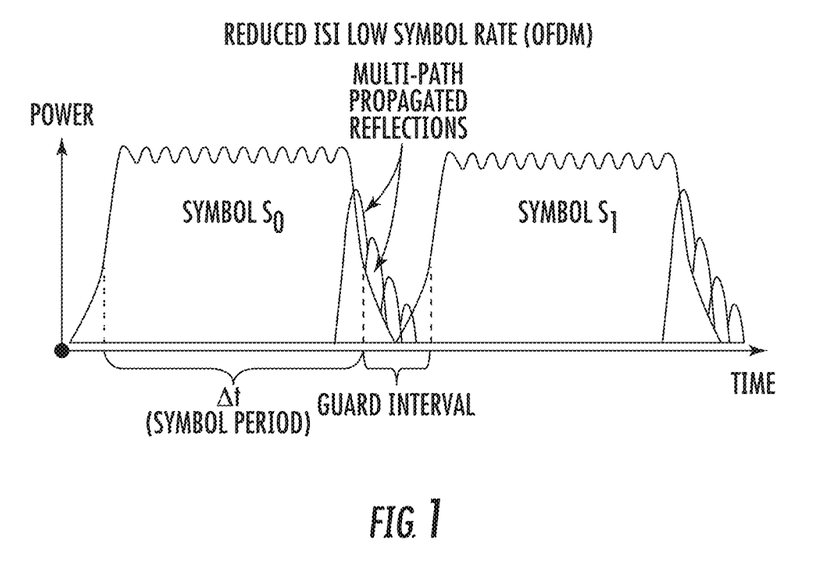
FIG. 1 is a graph of orthogonal frequency division multiplexed (OFDM) symbols in the time domain.

In 5G communications networks, orthogonal frequency division multiplexing (OFDM) is used to transmit signals over the air interface between user equipment and the radio equipment in the network. OFDM offers key features, such as high spectral efficiency, due to orthogonal subcarriers and robust performance in multipath mobile fading channels due to a large symbol period. FIG. 1 is a graph illustrating two OFDM symbols in the time domain. In FIG. 1, a guard interval between symbol $S_0$ and symbol $S_1$ prevents multipath propagated reflections from causing symbol errors. The robustness to multipath channels with simplified equalization allows higher order modulations, such as 256 quadrature amplitude modulation (QAM) and 1,024 QAM, for high throughput systems. However, as the number of points in the signal constellation increases, the likelihood of bit errors caused by phase noise also increases. Generally, the OFDM systems for wireless communications utilize reference or pilot symbols to compensate for the phase impairments that change relatively slow from one slot of OFDM symbols to another slot of OFDM symbols. Nevertheless, the reference symbols by themselves are not sufficient to cope with fast varying phase noise that changes from one OFDM symbol to another within one slot. The phase noise that remains in an OFDM system after correcting for the phase errors using reference symbols is referred to as residual phase noise. Accordingly, the subject matter described herein, by providing for efficient compensation for residual phase noise is particularly well suited for high order QAM systems, such as 256-QAM and 1,024-QAM systems.

Figure 2:
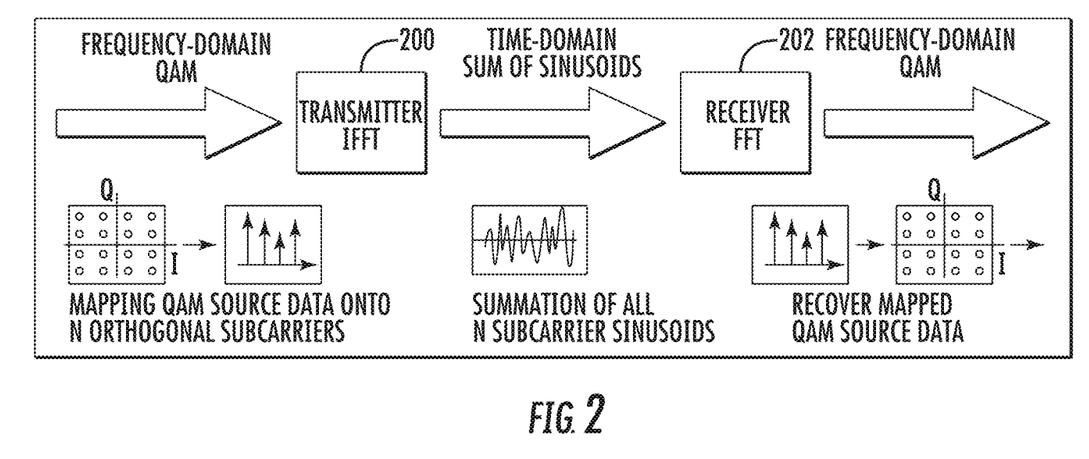
FIG. 2 is a block diagram of an exemplary OFDM transmitter and an OFDM receiver.

OFDM systems are typically implemented with fast Fourier transform (FFT) and inverse fast Fourier transform (IFFT) modules. FIG. 2 is a block diagram illustrating exemplary IFFT and FFT modules used in an OFDM system. Referring to FIG. 2, an OFDM transmitter 200 receives as input QAM data that is mapped on to M orthogonal subcarriers. In the illustrated example, the QAM signal constellation has 16 constellation points, meaning that each constellation point represents 4 bits of information. Each constellation point is mapped onto a subcarrier. Transmitter IFFT 200 performs an inverse fast Fourier transform operation to produce a time domain sum of sinusoids signal which is a summation of all N subcarrier sinusoids in the time domain.

On the receiver side, a receiver FFT module 202 converts the time domain sum of sinusoid signal into an orthogonal subcarriers in the frequency domain. The received symbols are mapped to constellation points in the symbol constellation. Each constellation point represents transmitted source data. Errors in phase of the transmitted signal can cause the mapping of received symbols to incorrect constellation points, and, as a result, bit errors can occur.

Phase noise in wireless communication systems can be caused by mismatches in the local oscillators (LOs) used to up convert and down convert radio signals. For example, the radio front end of a transmitter typically includes a mixer and a LO to up convert a baseband signal into an RF signal. A mixer along with an independent LO at the receiver down converts the RF signal back to baseband. In a typical communication system, the LO signal is obtained from a phase lock loop (PLL) circuit that is driven by a reference oscillator. Both reference oscillator and the PLL circuit characterize the phase noise profile of the LO signal. In short, the process of up conversion and down conversion introduces a phase impairment in the received time domain signal. Depending on the severity of phase impairment and other factors, this could lead to symbol detection error at the receiver.

Figure 3:
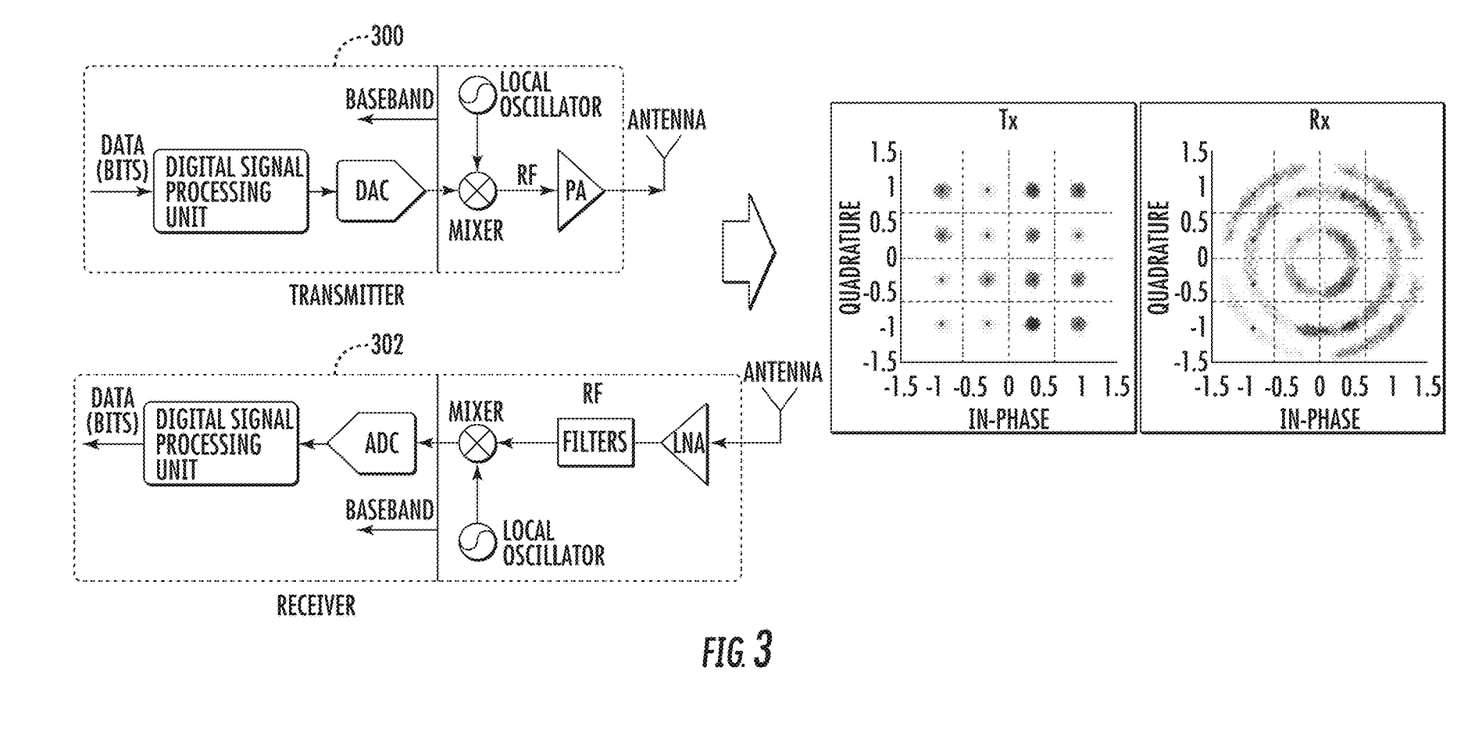
FIG. 3 is a diagram of OFDM transmitter and receiver radio front-ends and corresponding transmitted and received phase noise.

FIG. 3 illustrates an example of phase noise with large carrier frequency offset. In FIG. 3, an RF transmitter 300 includes a local oscillator and a mixer that up convert a baseband signal for transmission over the radio interface. An RF receiver 302 also includes a local oscillator and a mixer that down convert the radio signal from RF to baseband. The signal constellations on the right hand side of FIG. 3 respectively illustrate the transmitted and received signals. Interference caused by the mismatch of local oscillators phase and frequency results in the received signals being spread over the signal constellation. If a received symbol crosses a boundary to an adjacent constellation point, bit errors will occur.

Phase noise typically increases with the frequency of the local oscillator. Phase noise can be a major hardware impairment for NR deployments in high carrier frequencies, for example, in the millimeter wave bands. Unlike single carrier systems, OFDM systems that are multicarrier systems are more sensitive to phase noise introduced by local oscillators. As explained later in this disclosure, the time domain phase noise exhibits differently in OFDM systems that inherently demodulate the received signal in the frequency domain. In OFDM systems, the phase noise can lead to superposition of subcarriers in the frequency domain. This type of phase noise impairment in OFDM systems is referred to as inter-carrier interference (ICI). The phase noise in OFDM systems also introduce a common phase shift to all the subcarriers of the OFDM symbol. This type of phase noise impairment is called common phase error (CPE). Thus, for OFDM systems, the phase noise impacts system performance through both CPE and ICI.

Figure 4A:
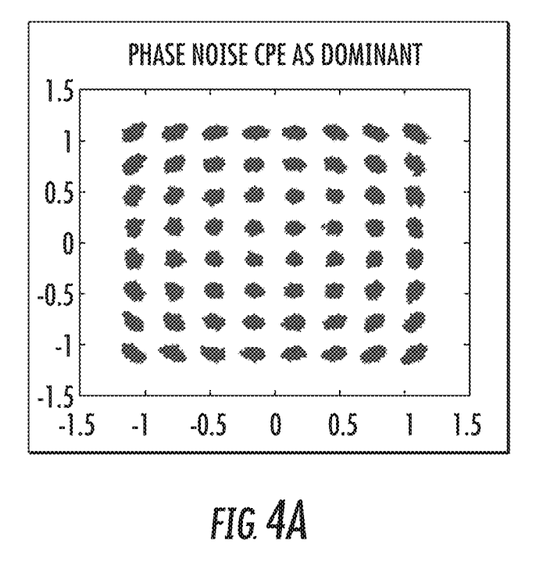
FIGS. 4A and 4B are diagrams of received signal constellations illustrating phase noise in 5G systems.
Figure 4B:
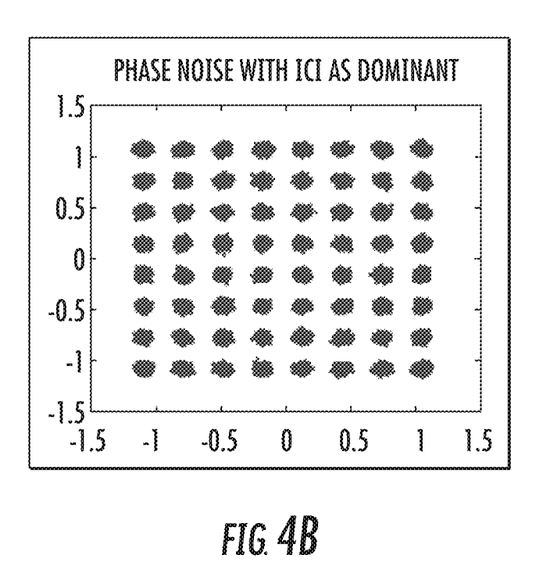

FIGS. 4A and 4B illustrate examples of phase noise in the received signal constellation. In FIG. 4A, the CPE is dominant, which is indicated by equal rotation of all points in the signal constellation. In FIG. 4B, ICI is dominant, resulting in unequal phase noise among signal constellation points.

Mathematically, in the presence of phase noise and after removing the CP, the received time domain signal corresponding to the $m^{th}$ OFDM symbol can be written as $$y_m(n) = e^{j\phi_m(n)} \left( \sum_{l=0}^{N-1} h(l) x_m(n-l)_N \right) + w_m(n)$$

where $\phi_m(n)$ represents the nth sample of the receiver phase noise, h(.) is the impulse response of the channel, $x_m(.)$ is the data symbol mapped to $m^{th}$ subcarrier, $w_m(.)$ is the additive white Gaussian noise and $(n-l)_N$ represents ((n–l) modulo N). After performing the FFT on $y_m(n)$, the kth subcarrier of the received OFDM symbol $Y_m[k]$ can be written as:

$$Y_m[k] = \alpha_m[k] \circledast (H[k]X_m[k]) + W_m[k] \quad (1)$$

$$= \sum_{l=0}^{N-1} \alpha_m[l]H[(k-l)_N]X_m[(k-l)_N] + W_m[k]$$

where $a_m[k]$ is the Fourier transform of the phase noise $\phi_m(n)$, such that $$\alpha_m[k] = \frac{1}{N} \sum_{l=0}^{N-1} e^{j\phi_m(n)} e^{-j2\pi kn/N} \quad (2)$$

for $k = 0, 1, \ldots, N-1$,

Rewriting (1) as $$Y_m[k] = \quad (3)$$

$$\underbrace{\alpha_m[0]H[k]X_m[k]}_{CPE} + \underbrace{\sum_{l=1,l\neq k}^{N-1} \alpha_m[l]H[(k-1)_N]X_m[(k-1)_N] + W_m[k]}_{ICI}$$

where the first term in Equation (3) corresponds to the CPE impairment while the second term corresponds to the ICI impairment.

In simple terms, the FFT operation within an OFDM receiver converts the time domain phase noise samples to an equivalent spectral phase noise. Using simple mathematical models and small angle assumption, it can be shown that the DC subcarrier of the spectral phase noise is common to all subcarriers within an OFDM symbol and contributes to CPE within an OFDM symbol.

In addition to the CPE, the time domain multiplication of the phase noise exhibits itself as a convolution in the frequency domain after the FFT operation and causes interference among different subcarriers of an OFDM symbol. This interference among subcarriers is generally termed as ICI.

Since the first impairment CPE is common to all subcarriers within an OFDM symbol, it can be corrected through pilot symbols or decision feedback. For 5G NR, pilot symbols are only available once per slot so the CPE correction on a symbol-by-symbol basis can only be achieved in a decision directed manner. This disclosure describes a low-complexity algorithm to compensate for the CPE.

Figure 5:
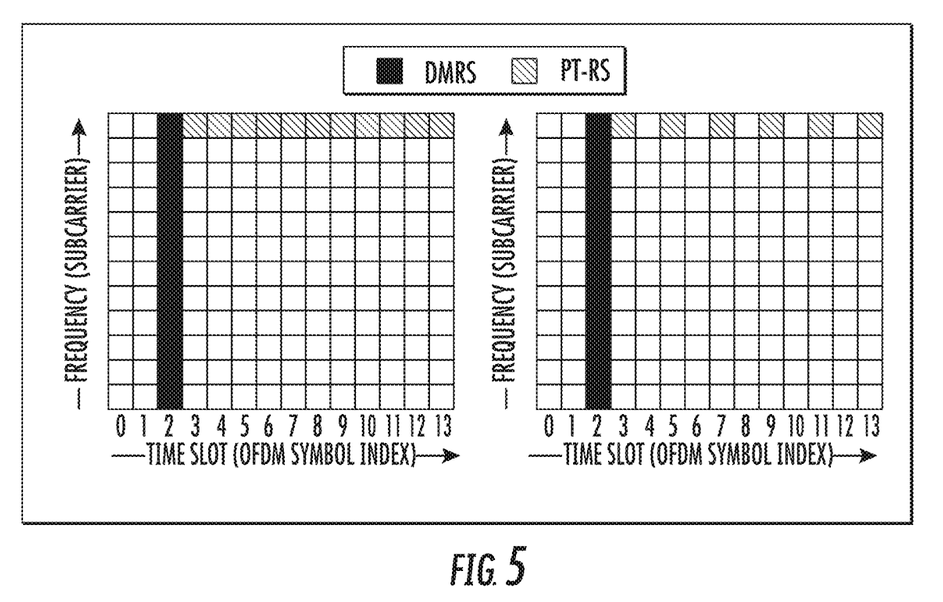
FIG. 5 is a diagram of 5G reference signals.

The subject matter described herein is directed to reducing residual phase noise, which is the phase noise that remains after correction is introduced by NR synchronization and reference signals. Similar to other wireless communication systems, a 5G NR downlink receiver may leverage synchronization signals to correct for carrier frequency offset as well as sampling time offset. Different types of reference signals are specified for 5G NR downlink signals including the demodulation reference signal (DMRS) and the phase tracking reference signal (PTRS). FIG. 5 illustrates an example of time and frequency allocation for DMRS and PTRS in a NR downlink slot. The DMRS is generally used for channel estimation at the receiver. The channel estimation may include the wireless propagation channel as well as the frequency response of the analog front-end of the radio receiver. In addition, the DMRS may be UE dependent and may be transmitted only once in a slot of 14 OFDM symbols. To meet the low-latency requirements for certain applications, the DMRS is front loaded and occupies at least one of the first few OFDM symbols in a slot. The PTRS is specifically introduced in NR to combat phase noise effects at millimeter-wave carrier frequencies (>24 GHz). A problem with the PTRS is that it is not mandatory for a NR base station to transmit PTRS at carrier frequencies below 6 GHz. Thus, PTRS cannot be used reliably under all scenarios to mitigate phase noise effects.

Figure 6:
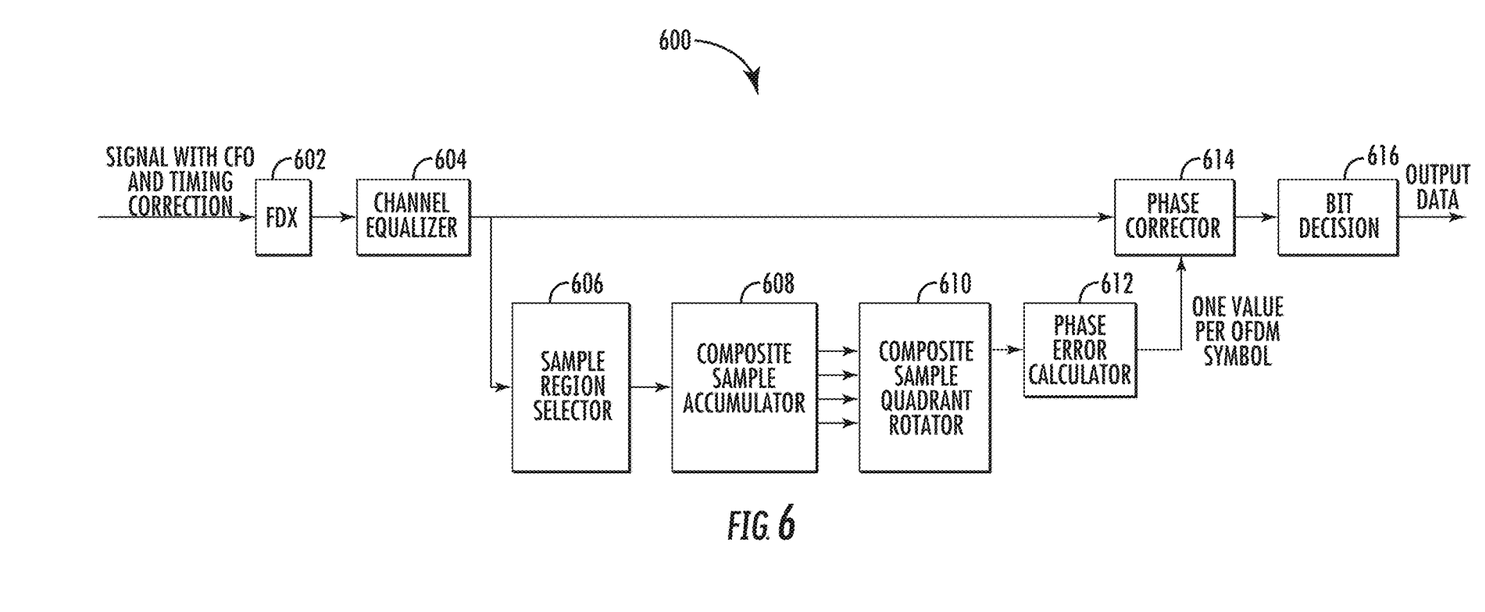
FIG. 6 is a block diagram of a 5G NR receiver with residual phase error correction.
Figure 7:
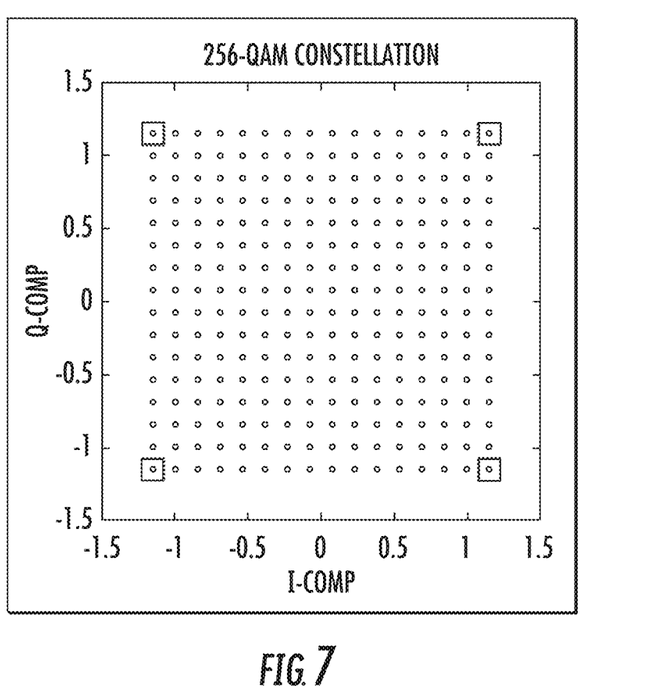
FIG. 7 is an OFDM signal constellation diagram illustrating the selection of the outermost decision region per quadrant as the sample accumulation region.

Accordingly, to reduce the effects of residual phase noise, the subject matter described herein includes decision directed per symbol phase compensation that efficiently calculates and compensates for common phase error per OFDM symbol in 5G NR downlink signals. FIG. 6 is a block diagram of a 5G NR receiver capable of correcting for residual common phase error in 5G NR downlink signals. Referring to FIG. 6, a receiver 600 includes a frequency domain transform block 602 that receives a time domain signal with common phase error and converts the signal to the frequency domain. In one example, frequency domain transform block 602 may be a fast Fourier transform block that performs a fast Fourier transform of the received signal. The received signal may be a 5G NR downlink signal and it may have gone through carrier frequency offset (CFO) correction in the upstream processing. The received signal may have also been adjusted for sampling error through timing correction in the upstream processing. A channel equalizer 604 performs channel equalization to equalize the signal amplitude and phase at different OFDM subcarriers and improves the SNR by reducing intersymbol interference due to multipath propagation channel. Channel equalizer 604 may use 5G NR downlink reference symbols shown in FIG. 5 to perform channel equalization. A sample region selector 606 selects outermost signal constellation decision regions to be used for sample accumulation. FIG. 7 illustrates an example of outermost constellation point selection that may be performed by sample region selector 606. In FIG. 7, a 256 QAM constellation is illustrated. The constellation points highlighted in each corner represent the outermost decision regions of the constellation. Signal samples falling in these decision regions have the highest SNR and are used in phase error estimation. Using only the samples that fall in the sample accumulation regions for phase error estimation, the phase noise compensation method described herein is computationally more efficient than methods that rely on larger sample accumulation regions.

A composite sample accumulator 608 accumulates samples that fall within the sample accumulation region in each quadrant. Composite sample accumulator 608 may accumulate the samples in each sample accumulation region by summing the I components and summing the Q components of each sample falling within the sample accumulation region to produce a first composite sample for the sample accumulation region. Because a signal constellation has four quadrants, the output of composite sample accumulator 608 will be four composite samples, one for each quadrant.

A composite sample quadrant rotator 610 rotates the first composite samples for three of the four quadrants from composite sample accumulator 608 so that all of the composite samples appear in a common quadrant, which simplifies calculation, as will be described in detail below. For example, if it is desirable for all of the composite samples to be in the fourth quadrant, composite sample quadrant rotator 610 will add 270° to the composite sample in quadrant I, 180° to the composite sample in quadrant II, 90° to the sample in quadrant III, and 0° to the composite sample in quadrant IV. It is worth mentioning that the phase rotation by 90° or 180° or 270° does not require any complex multiplication and can be simply achieved by changing the sign of I or Q component, or by interchanging I and Q components. As an example, consider the phase rotation by 90° (or $$\frac{\pi}{2}$$

radians) that is equivalent to multiplying the composite sample Z=a+bi by exp(-iπ/2)=0-1i to produce Z'=b-ai. Once all of the composite samples have been rotated to quadrant IV, composite sample quadrant rotator 610 may combine the composite samples by adding the I components of the composite samples to each other and the Q components of the composite samples to each other to produce a single composite sample for quadrant IV. Composite sample quadrant rotator 610 may select the quadrant to which the first composite samples are rotated by first selecting a signal constellation point belonging to one of the four outermost constellation point decision regions as a reference constellation point. Once the reference constellation point is selected, composite sample quadrant rotator 610 may rotate the first composite samples to the quadrant of the reference constellation point. Composite sample quadrant rotator 610 may also combine the rotated first composite samples to form a second composite sample.

A phase error calculator 612 calculates an estimate of the common phase error based on the difference between the phase of the second rotated composite sample and the phase of the reference constellation point. Continuing with the example, if the reference constellation point has a phase of 330° and the rotated second composite sample has a phase of 325°, then the phase error will be 5°.

A phase corrector 614 applies a phase correction value per OFDM symbol to the symbols output by channel equalizer 604. Continuing with the example above, if the phase error is 5 degrees, then phase corrector 614 may apply a phase correction of negative 5 degrees to each subcarrier in the OFDM data symbol. Phase corrector 614 may output the phase-error-corrected OFDM data symbol to bit decision block 616. Bit decision block 616 may output data bits by mapping the phase error corrected OFDM subcarriers to signal constellation points and outputting the bits for each OFDM subcarrier in the OFDM data symbol.

The following continues the mathematical description from above regarding the calculation of residual common phase error. From Equation (3) above, the CPE estimation amounts to estimating $\alpha_m[0]$. After channel equalization, Equation (3) becomes $$Z_m[k]=\alpha_m[0]X_m[k]+V_m[k] \qquad (4)$$

where $V_m[k]$ represents combined noise due to ICI and additive white Gaussian noise (AWGN). Since $\alpha_m[0]=1/N \sum_{n=0}^{N-1} e^{i\Phi_m(n)}$, under small phase noise, the complex number $\alpha_m[0]$ can be approximated as unit amplitude for a given OFDM symbol such that $\alpha_m[0] \approx e^{i\psi_m}$. Thus, Equation (4) becomes $$Z_m[k] \approx e^{i\psi_m} X_m[k]+V_m[k] \qquad (5)$$

which shows that the CPE impairment can be corrected by derotating the equalizer output by a common phase $\psi_m$ that is common to all subcarriers. Assuming independent noise $V_m[k]$ across subcarriers, an ad-hoc but intuitive estimator for $\psi_m$ can be obtained by averaging the phase difference between each of the equalizer output $Z_m[k]$ and the nearest M-QAM constellation point $\hat{X}_m[k]$ such that $$\hat{\psi}_m = \frac{1}{N} \sum_{k=0}^{N-1} \angle Z_m[k] - \angle \hat{X}_m[k] \qquad (6)$$

where $\angle$ denotes the angle of the complex argument. The derotated equalizer output with CPE correction is given by $$\tilde{Z}_m[k]=e^{-i\hat{\psi}_m}Z_m[k] \text{ for } k=0,1,\ldots,N-1 \qquad (7)$$

The computations involved in estimating $\hat{\psi}_m$ are significant for large N=4096. As a first order simplification, only certain points from the received signal constellation can be used to estimate $\hat{\psi}_m$. For a given M-QAM constellation, the symbols farthest from the origin has the highest signal-to-noise ratio (SNR). Thus, a simple check on $Z_m[k]$ can select the outermost QPSK like constellation points from the M-QAM symbols. For 256-QAM constellation, the sample accumulation regions that include outermost constellation point decision regions can be represented as subsets $\mathcal{S}_1$, $\mathcal{S}_2$, $\mathcal{S}_3$ and $\mathcal{S}_4$ for each of the four quadrants, respectively, such that $$\mathcal{S}_1 = \{Z_m[k] | Z_{1,m}[k] = Z_m[k] \text{ for which } \text{real}(Z_m[k]) > \lambda \\ \& \text{ imag}(Z_m[k]) > \lambda)\},$$

$$\mathcal{S}_2 = \{Z_m[k] | Z_{2,m}[k] = Z_m[k] \text{ for which } \text{real}(Z_m[k]) < -\lambda \& \text{ imag}(Z_m[k]) > \lambda)\},$$

$$\mathcal{S}_3 = \{Z_m[k] | Z_{3,m}[k] = Z_m[k] \text{ for which } \text{real}(Z_m[k]) < -\lambda \& \text{ imag}(Z_m[k]) < -\lambda)\} \text{ and}$$

$$\mathcal{S}_4 = \{Z_m[k] | Z_{4,m}[k] = Z_m[k] \text{ for which } \text{real}(Z_m[k]) > \lambda \\ \& \text{ imag}(Z_m[k]) < -\lambda)\} \qquad (8)\text{-}(11).$$

In Equation 8-11, $Z_{q,m}[k]$ denotes the kth subcarrier of the $m^{th}$ OFDM symbols in the $q^{th}$ quadrant. As an example, for standard 256-QAM constellation, $\lambda=14/\sqrt{170}$ and $Z_{q,m}$ are shown by the boxed regions in the outermost corners of the signal constellation in FIG. 7. Thus, the first composite sample $\overline{Z}_{q,m}$ of the $q^{th}$ quadrant of the $m^{th}$ OFDM symbol can be mathematically written as $$\overline{Z}_{q,m} = \Sigma_{Z_{q,m} \in \mathcal{S}_q} Z_{q,m}[k] \text{ for } q=1,2,3 \text{ and } 4 \qquad (12)$$

As an example, for the standard 256-QAM constellation shown in FIG. 7, a reference constellation point belonging to the outermost constellation point decision region can be arbitrarily selected as $$X_{ref}^{(1)} = \frac{15+15i}{\sqrt{170}} \text{ or } X_{ref}^{(2)} = \frac{-15+15i}{\sqrt{170}} \text{ or}$$

$$X_{ref}^{(3)} = \frac{-15-15i}{\sqrt{170}} \text{ or } X_{ref}^{(4)} = \frac{15-15i}{\sqrt{170}}.$$

Selecting $X_{ref}^{(1)}$ as the reference constellation point, which belongs to the first quadrant, the first composite samples from the $2^{nd}$ quadrant, the $3^{rd}$ quadrant and the $4^{th}$ quadrant can be rotated by 90° (or radians), 180° (or $\pi$ radians) and 270° (or $\frac{3\pi}{2}$ radians), respectively. Combining the rotated first composite samples, the second composite sample $\hat{Z}_m$ can be written as $$\hat{Z}_m = \Sigma_{q=2}^{4} e^{-i(q-1)\pi/2} \overline{Z}_{q,m} \quad (13)$$

Thus, the phase error $\hat{\psi}_m$ between the second composite sample $\hat{Z}_m$ and the selected reference constellation point $X_{ref}^{(1)}$ is $$\hat{\psi}_m = \angle \hat{Z}_m - \frac{\pi}{4} \quad (14)$$

Using $\hat{\psi}_m$ in Equation (14), the CPE can be compensated as $$\tilde{Z}_m[k] = e^{-i\hat{\psi}_m} Z_m[k] \text{ for } k=0,1,\ldots,N-1 \quad (15)$$

Thus, the methodology described herein includes generating a single composite sample for each quadrant in a received signal constellation and rotating the samples in three of the four quadrants so that the composite samples are in the same quadrant. Such a method is computationally less intensive than approaches in which all of the received samples are rotated to a common quadrant. In addition, accumulating samples that fall within the outermost constellation point decision region of each quadrant is also computationally less intensive than approaches for phase error estimation where amplitude or power thresholding is used to identify samples with sufficient SNR that can be used for that purpose.

Figure 8A:
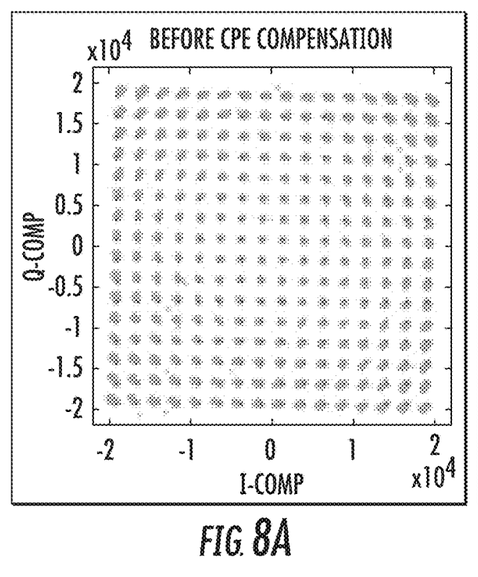
FIGS. 8A and 8B respectively illustrate a received signal constellation with and without phase error correction.
Figure 8B:
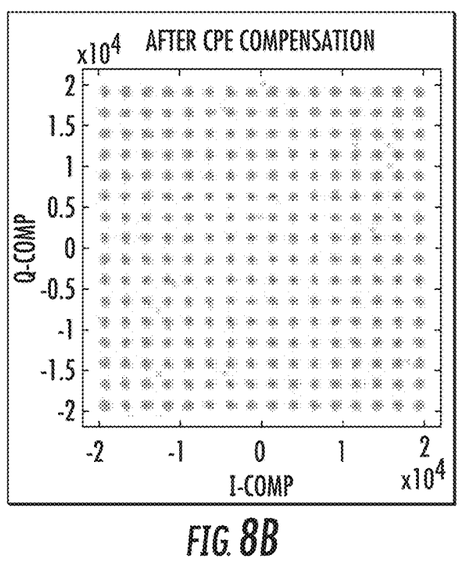
Figure 8C:
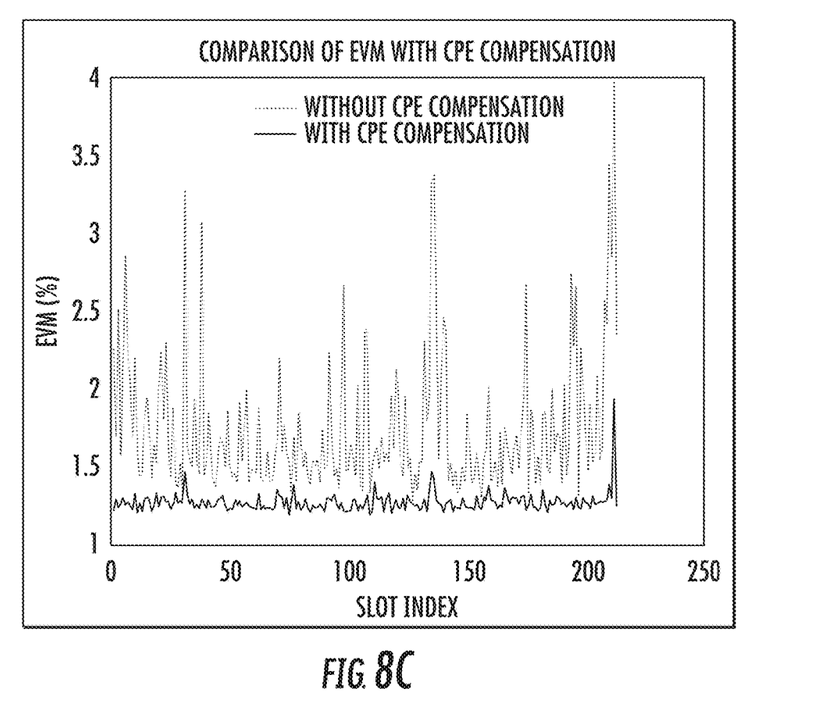
FIG. 8C is a graph of error vector magnitude with and without phase error correction.

FIGS. 8A and 8B illustrate results of processing the downlink signal using the phase error compensation method described herein. In particular, FIG. 8A illustrates a received signal constellation without CPE compensation. FIG. 8B illustrates the received signal constellation of FIG. 8A after CPE compensation. To assess the quality of a received signal, mean square error in the form of error vector magnitude (EVM) is typically used. FIG. 8C illustrates the error vector magnitude of the received signal with and without CPE compensation.

Figure 9:
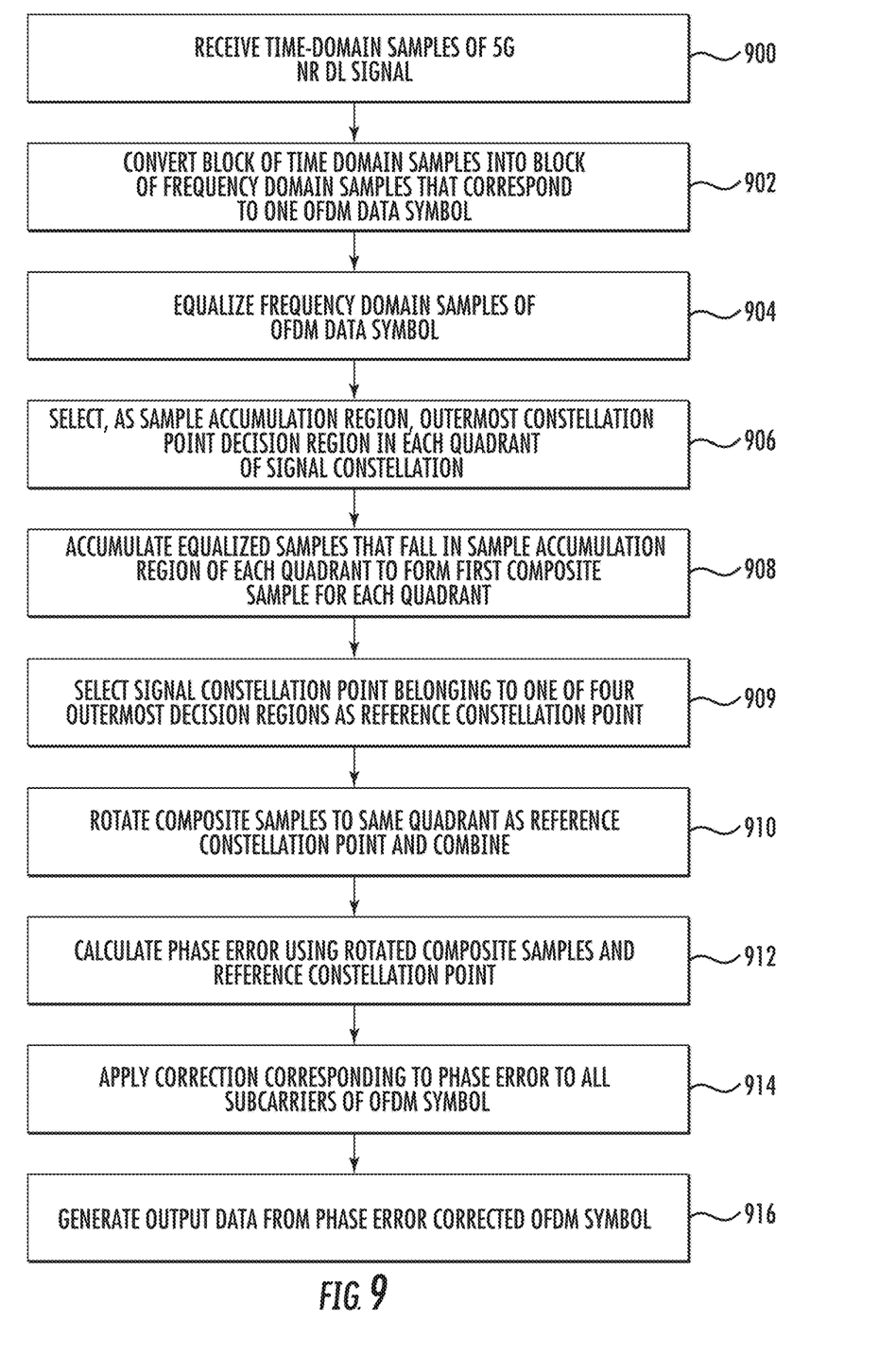
FIG. 9 is a flow chart illustrating an exemplary process for calculating and compensating for phase error in 5G NR DL signals.

FIG. 9 is a flow chart illustrating an exemplary process for estimating phase error in 5G downlink signals and using the estimated phase error to correct phase impairment in all the subcarriers of the OFDM signal of the 5G downlink signal. Referring to FIG. 9, in step 900, time domain samples of a 5G NR downlink signal are received. For example, a 5G receiver in a UE or in a multi-UE emulator may receive samples of a 5G NR DL signal from a gNode B.

In step 902, a block of the time domain samples is converted into a block of frequency domain samples that correspond to one OFDM symbol. For example, FFT block 602 illustrated in FIG. 6 may convert time domain samples into a block of frequency domain samples for one OFDM symbol.

In step 904, the frequency domain samples of the OFDM symbol are equalized. For example, channel equalizer 604 may equalize the signal amplitude and phase at different OFDM subcarriers.

In step 906, an outermost constellation point decision region in each quadrant of the signal point constellation is selected as the sample accumulation region for each quadrant. For example, referring to FIG. 7, the box surrounding the signal constellation point in the outermost corner of each quadrant of the 256 QAM constellation may be selected as the sample accumulation region for each quadrant.

In step 908, the process includes accumulating equalized samples in each quadrant that fall within the sample accumulation region of the quadrant to form a first composite sample for each quadrant. Accumulating the samples that fall within the sample accumulation region may include combining the samples that fall in the sample accumulation region of each quadrant. Combining the samples may include summing the I components of the samples and summing the Q components of the samples. For example, if two samples falling in the sample accumulation region have complex values a+bi and c+di, where a and c are the I components and b and d are the Q components, the first composite sample for the quadrant will be (a+b)+(c+d)i, where (a+b) is the value of the in-phase component of the first composite sample and (c+d) is the value of the quadrature component of the first composite sample. One composite sample will be accumulated for each quadrant and using only the samples that fall within the sample accumulation region. Using only samples that fall within the sample accumulation region reduces the amount of calculations required to compute the phase error over systems that utilize all of the samples in each quadrant. In addition, only three sample rotations are required to rotate the composite samples to a common quadrant.

In step 909, the process includes selecting a signal constellation point belonging to one of the four outermost constellation point decision regions as a reference constellation point. For example, the constellation point for the outermost constellation point decision region in quadrant IV may be selected as the reference constellation point.

In step 910, the composite samples in each quadrant are rotated to the same quadrant as the reference constellation point. The rotation may be achieved by interchanging the I and Q components of the composite sample along with the sign of the I and Q component. Once the samples are rotated, the I components of the rotated samples may be added to each other and the Q components of the rotated samples may be added to each other to produce a second composite sample.

In step 912, the process includes calculating the phase error using the rotated composite sample and the reference constellation point. The phase error may be calculated as the difference between the phase of the reference constellation point and the phase of the rotated composite sample. For example, if the phase of the rotated composite sample is 257° and the phase of the reference constellation point is 260°, then the phase error will be −3°.

In step 914, the process includes applying phase correction corresponding to the phase error to all subcarriers of the OFDM symbol. For example, once the phase error is calculated, an amount of phase rotation equal in magnitude but opposite in direction to the phase error may be applied to each subcarrier in the OFDM symbol. For example, if the phase error is calculated to be 4°, the amount of phase correction applied to each subcarrier will be −4°.

In step 916, the process includes generating output data from the phase-error-corrected OFDM symbol. For example, data bits corresponding to each subcarrier may be determined by the closest OFDM symbol point to each phase error corrected sample. Using 256 QAM as an example, each sample will map to one of the 256 signal constellation points, that the corresponding data will be the 8 data bits of the signal constellation point closest to the sample.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for determining and compensating for residual phase noise in a 5G new radio (NR) downlink (DL) signal, the method comprising:
   receiving time domain samples of a 5G NR DL signal;
   converting a block of the time domain samples into a block of frequency domain samples for one orthogonal frequency division multiplexed (OFDM) data symbol;
   equalizing the frequency domain samples in the block of frequency domain samples of the OFDM data symbol;
   selecting an outermost constellation point decision region in each of four quadrants of an OFDM signal constellation as a sample accumulation region;
   combining equalized samples of the OFDM data symbol that fall in the sample accumulation region of each quadrant to form a first composite sample for each quadrant;
   selecting a signal constellation point belonging to one of the four outermost constellation point decision regions as a reference constellation point;
   rotating at least some of the first composite samples so that the rotated first composite samples are in the same quadrant as the reference constellation point;
   combining the rotated first composite samples to produce a second composite sample;
   calculating a phase error between the second composite sample and the reference constellation point;
   applying phase correction corresponding to the phase error to all subcarriers of the OFDM data symbol; and
   generating output data from the phase-error-corrected OFDM symbol.

2. The method of claim 1 wherein receiving the time domain samples of the 5G NR DL signal includes receiving the samples at a 5G user equipment (UE) device.

3. The method of claim 1 wherein receiving the time domain samples of the 5G NR DL signal includes receiving the samples at a 5G user equipment (UE) emulator device.

4. The method of claim 1 wherein converting the block of time domain samples into the block of frequency domain samples includes performing fast Fourier transform (FFT) processing of the time domain samples.

5. The method of claim 1 wherein selecting the outermost OFDM signal constellation point decision region includes selecting, as the outermost signal constellation point decision region, a decision region of an OFDM signal constellation point having a largest distance from the origin.

6. The method of claim 1 wherein combining the equalized samples that fall in the sample accumulation region of each quadrant includes adding I components of the equalized samples that fall in the sample accumulation region of each quadrant and adding Q components of the equalized samples that fall in the sample accumulation region of each quadrant.

7. The method of claim 1 wherein rotating at least some of the first composite samples includes adding phase shifts to three of the first composite samples so that the three first composite samples are in the same quadrant as a fourth of the first composite samples.

8. The method of claim 1 wherein combining the rotated first composite samples includes adding I components of the rotated first composite samples and adding Q components of the rotated first composite samples.

9. The method of claim 1 wherein calculating the phase error includes calculating a phase difference between the second composite sample and the reference constellation point.

10. The method of claim 1 wherein applying the phase correction to the subcarriers includes adding an amount of phase correction equal to and opposite in magnitude to the phase error to each subcarrier in the OFDM symbol.

11. A system for determining and compensating for residual phase noise in a 5G new radio (NR) downlink (DL) signal, the system comprising:
    a frequency domain transform block for receiving time domain samples of a 5G NR DL signal and for converting a block of the time domain samples into a block of frequency domain samples for one orthogonal frequency division multiplexed (OFDM) data symbol;
    an equalizer for equalizing the frequency domain samples in the block of frequency domain samples of the OFDM data symbol;
    a sample region selector for selecting an outermost constellation point decision region in each of four quadrants of an OFDM signal constellation as a sample accumulation region;
    a composite sample accumulator for combining equalized samples that fall in the sample accumulation region of each quadrant to form a first composite sample for each quadrant;
    a composite sample quadrant rotator for selecting a signal constellation point belonging to one of the four outermost constellation point decision region as a reference constellation point, for rotating at least some of the first composite samples so that the first composite samples are in the same quadrant as the reference constellation point, and for combining the rotated first composite samples to produce a second composite sample;
    a phase error calculator for calculating a phase error between the second composite sample and the reference constellation point;
    a phase corrector for applying phase correction corresponding to the phase error to all subcarriers of the OFDM data symbol to produce a phase-error-corrected OFDM data symbol; and
    a bit decision block for generating output data from the phase-error-corrected OFDM data symbol.

12. The system of claim 11 comprising a 5G user equipment (UE) device, wherein the equalizer, the sample region selector, the composite sample accumulator, the composite sample quadrant rotator, the phase error calculator, the phase corrector, and the bit decision block are components of the 5G UE device.

13. The system of claim 11 comprising a 5G user equipment (UE) emulator, wherein the equalizer, the sample region selector, the composite sample accumulator, the composite sample quadrant rotator, the phase error calculator, the phase corrector, and the bit decision block are components of the 5G UE emulator.

14. The system of claim 11 wherein the sample region selector is configured to select, as the outermost signal constellation point decision region, a decision region of an OFDM signal constellation point having a largest distance from the origin.

15. The system of claim 11 wherein the composite sample accumulator is configured to combine the equalized samples by adding I components of the equalized samples that falls in the sample accumulation region of each quadrant and adding Q components of the equalized samples that falls in the sample accumulation region of each quadrant.

16. The system of claim 11 wherein the composite sample quadrant rotator is configured to rotate at least some of the first composite samples by adding phase shifts to three of the first composite samples so that the three first composite samples are in the same quadrant as a fourth of the first composite samples.

17. The system of claim 11 wherein the composite sample quadrant rotator is configured to combine the rotated first composite samples by adding I components of the rotated first composite samples and adding Q components of the rotated first composite samples.

18. The system of claim 11 wherein the phase error calculator is configured to calculate the phase error by calculating a phase difference between the second composite sample and a phase of the reference constellation point.

19. The system of claim 11 wherein the phase corrector is configured to apply the phase correction to the subcarriers by adding an amount of phase correction equal to and opposite in magnitude to the phase error to each subcarrier in the OFDM symbol.

20. A non-transitory computer readable medium having stored thereon executable instructions that when executed by a processor of a computer control the computer to perform steps comprising:
receiving time domain samples of a 5G new radio (NR) downlink (DL) signal;
converting a block of the time domain samples into a block of frequency domain samples for one orthogonal frequency division multiplexed (OFDM) data symbol;
equalizing the frequency domain samples in the block of frequency domain samples of the OFDM data symbol;
selecting an outermost constellation point decision region in each of four quadrants of an OFDM signal constellation as a sample accumulation region;
combining equalized samples of the OFDM data symbol that fall in the sample accumulation region of each quadrant to form a first composite sample for each quadrant;
selecting a signal constellation point belonging to one of the four outermost constellation point decision regions as a reference constellation point;
rotating at least some of the first composite samples so that the first composite samples are in the same quadrant as the reference constellation point;
combining the rotated first composite samples to produce a second composite sample;
calculating a phase error between the second composite sample and the reference constellation point;
applying phase correction corresponding to the phase error to all subcarriers of the OFDM data symbol to produce a phase-error-corrected OFDM data symbol; and
generating output data from the phase-error-corrected OFDM data symbol.

\* \* \* \* \*